United States Patent
Kadambi et al.

(10) Patent No.: US 7,493,451 B2
(45) Date of Patent: Feb. 17, 2009

(54) PREFETCH UNIT

(75) Inventors: Sudarshan Kadambi, Sunnyvale, CA (US); Puneet Kumar, Mountain View, CA (US); Po-Yung Chang, Saratoga, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 271 days.

(21) Appl. No.: 11/453,708

(22) Filed: Jun. 15, 2006

(65) Prior Publication Data

US 2007/0294482 A1    Dec. 20, 2007

(51) Int. Cl.
*G06F 12/02* (2006.01)
(52) U.S. Cl. ........................ 711/137; 711/204
(58) Field of Classification Search ............ None
See application file for complete search history.

(56) References Cited

U.S. PATENT DOCUMENTS

| | | | |
|---|---|---|---|
| 5,357,618 A | 10/1994 | Mirza et al. | |
| 5,761,706 A * | 6/1998 | Kessler et al. | 711/118 |
| 6,119,203 A * | 9/2000 | Snyder et al. | 711/137 |
| 6,460,115 B1 | 10/2002 | Kahle et al. | |
| 6,571,318 B1 | 5/2003 | Sander et al. | |
| 6,915,415 B2 | 7/2005 | Mayfield et al. | |
| 2003/0105926 A1* | 6/2003 | Rodriguez | 711/129 |
| 2006/0048120 A1* | 3/2006 | Archambault et al. | 717/160 |
| 2006/0179239 A1* | 8/2006 | Fluhr et al. | 711/137 |
| 2007/0174555 A1* | 7/2007 | Burtscher et al. | 711/137 |
| 2007/0204108 A1* | 8/2007 | Griswell et al. | 711/137 |

OTHER PUBLICATIONS

IBM, "PowerPC Virtual Environment Architecture," Book II, Version 2.01, Dec. 2003, 7 pages.

* cited by examiner

*Primary Examiner*—Than Nguyen
(74) *Attorney, Agent, or Firm*—Lawrence J. Merkel; Meyertons, Hood, Kivlin, Kowert & Goetzel, P.C.

(57) ABSTRACT

In one embodiment, a processor comprises a prefetch unit coupled to a data cache. The prefetch unit is configured to concurrently maintain a plurality of separate, active prefetch streams. Each prefetch stream is either software initiated via execution by the processor of a dedicated prefetch instruction or hardware initiated via detection of a data cache miss by one or more load/store memory operations. The prefetch unit is further configured to generate prefetch requests responsive to the plurality of prefetch streams to prefetch data in to the data cache.

30 Claims, 5 Drawing Sheets

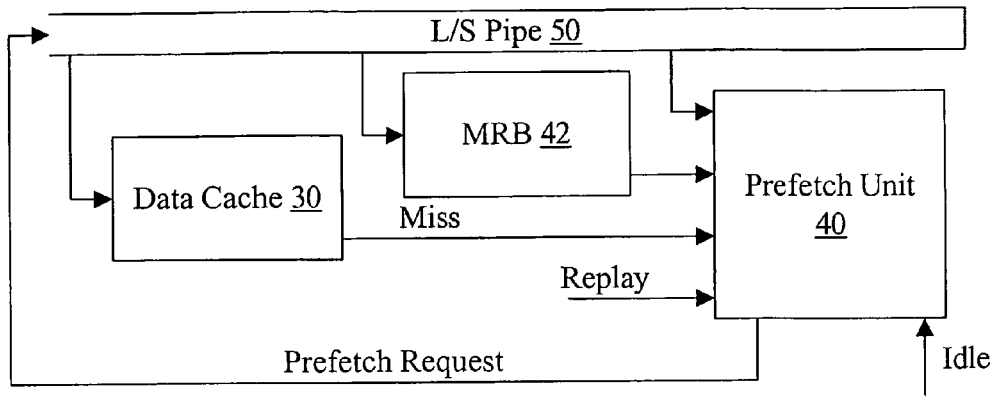
Fig. 2
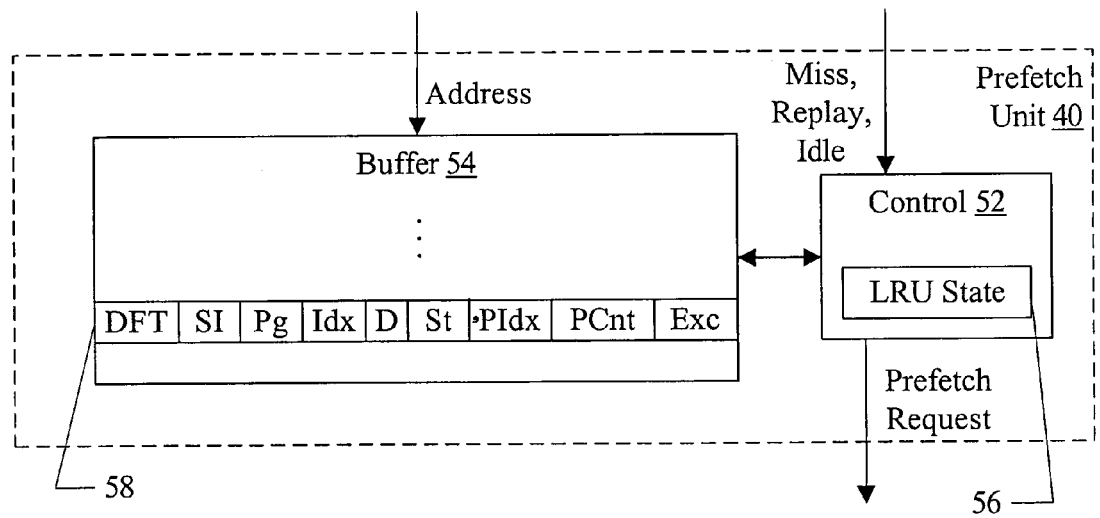
Fig. 3
| St | Meaning |
|---|---|
| 00 | Entry Invalid |
| 01 | Allocated |
| 10 | Stride Computed |
| 11 | Prefetch Ready |
Fig. 4

| DT | DD | LW | LW+1 | LW+2 |
|---|---|---|---|---|
| Data Cache Lookup | Data Cache Hit/Miss, MRB Lookup | Replay Detected | If No Replay, CAM Prefetch | If CAM miss, allocate If CAM hit, update |

| AG | TR | DT | DD | LW |
|---|---|---|---|---|
| Insert Prefetch Request | Transport Address to Cache | Cache Lookup | Data Cache Hit/Miss, MRB Lookup | MRB Allocate, Replay Detection |

PREFETCH UNIT

BACKGROUND

1. Field of the Invention

This invention is related to the field of processors and, more particularly, to prefetching in processors.

2. Description of the Related Art

Memory latency is frequently a large factor in determining the performance (e.g. instructions executed per second) of a processor in a given system. Over time, the operating frequencies of processors have increased dramatically, while the latency for access to dynamic random access memory (DRAM) in the typical system has not decreased as dramatically. Accordingly, the number of processor clocks required to access the external memory has increased, from latencies (as measured in processor clocks) of a few processor clocks, through tens of processor clocks, to over a hundred processor clocks in modern systems.

Processors have implemented caches to combat the effects of memory latency on processor performance. Caches are relatively small, low latency memories incorporated into the processor or coupled nearby. The caches store recently used instructions and/or data under the assumption that the recently used information may be accessed by the processor again. The caches thus reduce the effective memory latency experienced by a processor by providing frequently accessed information more rapidly than if the information had to be retrieved from the memory system in response to each access.

If processor memory requests (e.g. instruction fetches and load/store memory operations) are cache hits (the requested information is stored in the processor's cache), then the memory requests are not transmitted to the memory system. Accordingly, memory bandwidth may be freed for other uses. However, the first time a particular memory location is accessed, a cache miss occurs (since the requested information is stored in the cache after it has been accessed for the first time) and the information is transferred from the memory system to the processor (and may be stored in the cache). Additionally, since the caches are finite in size, information stored therein may be replaced by more recently accessed information. If the replaced information is accessed again, a cache miss will occur. The cache misses then experience the memory latency before the requested information arrives.

One way that the memory bandwidth may be effectively utilized is to predict the information that is to be accessed soon and to prefetch that information from the memory system into the cache. If the prediction is correct, the information may be a cache hit at the time of the actual request and thus the effective memory latency for actual requests may be decreased. Alternatively, the prefetch may be in progress at the time of the actual request, and thus the latency for the actual request may still be less than the memory latency even though a cache hit does not occur for the actual request. On the other hand, if the prediction is incorrect, the prefetched information may replace useful information in the cache, causing more cache misses to be experienced than if prefetching were not employed and thus increasing the effective memory latency.

Also, many instruction set architectures (ISAs) support prefetch instructions designed to permit software to prefetch data that it expects will be used in the near future. Processors often treat such instruction as loads. The prefetch instructions consume memory bandwidth, and can conflict with hardware-controlled prefetching, reducing overall performance.

SUMMARY

In one embodiment, a processor comprises a prefetch unit coupled to a data cache. The prefetch unit is configured to concurrently maintain a plurality of separate, active prefetch streams. Each prefetch stream is either software initiated via execution by the processor of a dedicated prefetch instruction or hardware initiated via detection of a data cache miss by one or more load/store memory operations. The prefetch unit is further configured to generate prefetch requests responsive to the plurality of prefetch streams to prefetch data in to the data cache. A similar method is also contemplated In another embodiment, a processor comprises a prefetch unit coupled to a data cache. The prefetch unit includes a buffer having a plurality of entries, each of which is usable for a different prefetch stream. The prefetch unit is configured to filter load/store memory operations through the buffer and is further configured to generate prefetch requests from the contents of the buffer. The prefetch requests cause data to be prefetched into the data cache. A similar method is also contemplated.

BRIEF DESCRIPTION OF THE DRAWINGS

The following detailed description makes reference to the accompanying drawings, which are now briefly described.

FIG. 2 is a block diagram of a portion of one embodiment of the processor shown in FIG. 1.

FIG. 3 is a block diagram of one embodiment of a prefetch unit shown in FIGS. 1 and 2.

FIG. 4 is a table illustrating one embodiment of a state field shown in FIG. 3.

Figure 1:
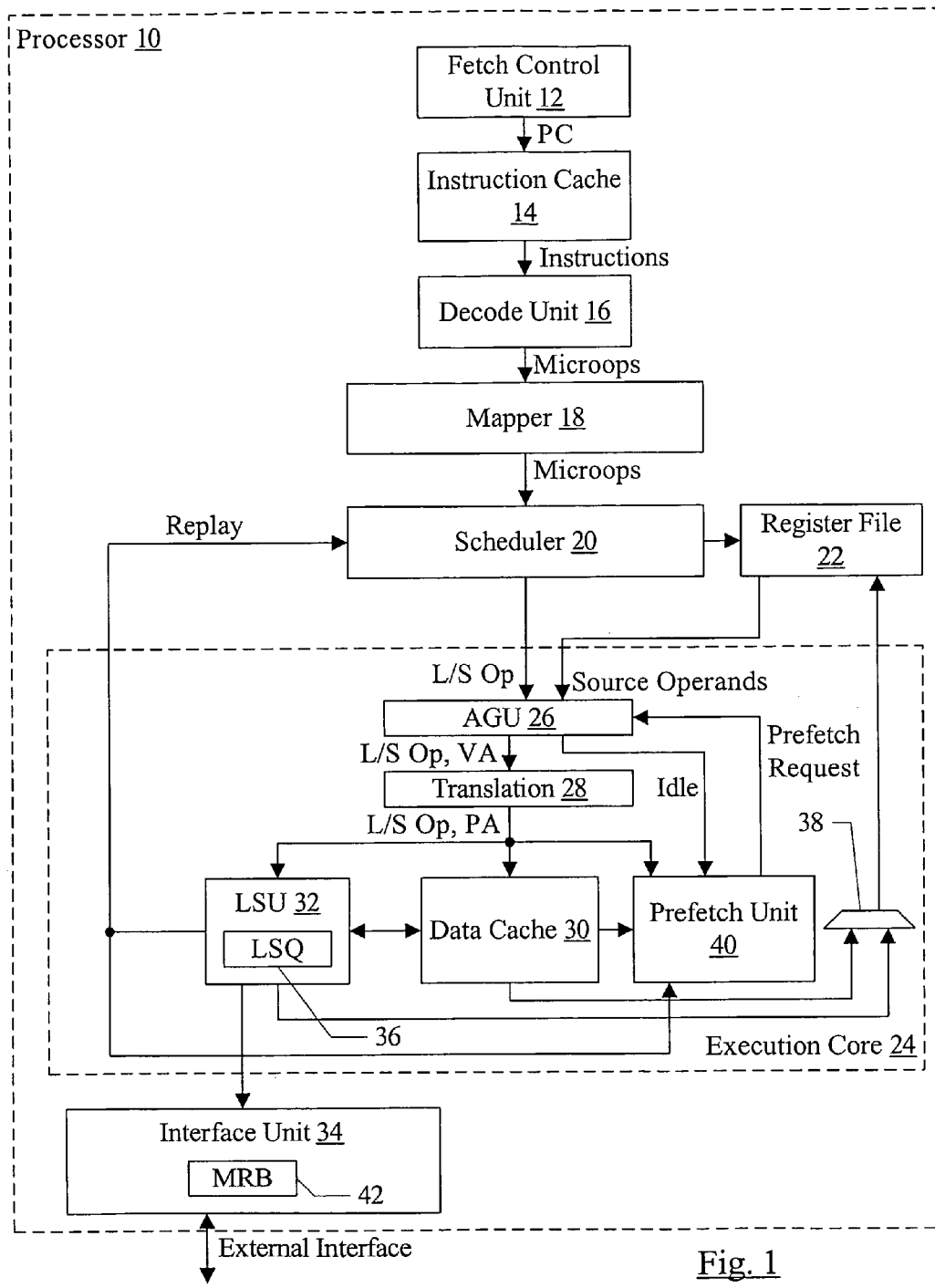
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. In the illustrated embodiment, the execution core 24 includes an address generation unit (AGU) 26, a translation unit 28, a data cache 30, a load/store unit 32 (which includes a load/store queue (LSQ) 36), and a prefetch unit 40. The interface unit 34 includes a memory request buffer (MRB) 42. The fetch control unit 12 is coupled to provide a program counter (PC) for fetching from the instruction cache 14. The instruction cache 14 is coupled to provide instructions to the decode unit 16, which is coupled to provide microops to the mapper 18. The mapper 18 is coupled to provide microops (and mapped register operands) to the scheduler 20. The scheduler 20 is coupled to receive a replay signal from the load/store unit (LSU) 32, is coupled to the register file 22, and is coupled to provide load/store microops (L/S Op) for execution to the address generation unit 26. The register file is coupled to provide operands to the address generation unit 26, and is coupled to receive results to be written to the register file 22 from a mux 38. The mux 38 is coupled to receive data from the data cache 30 and the LSU 32. The address generation unit 26 is configured to provide a virtual address (VA) to the translation unit 28, along with the L/S op. The translation unit 28 is configured to provide a corresponding physical address (PA) along with the L/S op to the data cache 30 for access, and also provides the information to the LSU 32 and the prefetch unit 40. The prefetch unit 40 may further receive the replay signal, an Idle signal from the AGU 26, and may be coupled to the data cache 30. The prefetch unit 40 may also be configured to provide a prefetch request to the AGU 26. The LSU 32 is coupled to the data cache 30 and the interface unit 34, which is further coupled to an external interface of the processor 10.

The prefetch unit 40 is configured to generate prefetch requests in the processor 10 to prefetch data into the data cache 30. In one embodiment, the prefetch unit 40 is configured to concurrently maintain multiple separate, independent prefetch streams. For example, up to 12 prefetch streams may be supported in one implementation, although more or fewer streams may be supported in other implementations. Each prefetch stream may be either hardware-initiated or software-initiated. Hardware-initiated prefetch streams may be detected by the prefetch unit 40, by monitoring the load/store traffic through the data cache 30. The prefetch unit 40 may detect patterns of access in the load/store traffic and identify streams for prefetching. The software-initiated prefetch streams may be the result of prefetch instructions included in the software being executed by the processor 10. The prefetch instructions may identify the address to be prefetch, and may optionally supply one or more attributes to direct the prefetching activity.

By sharing the same set of available prefetch streams between software and hardware, the total number of prefetch streams that may be active at any given time may be controlled. For example, if the software being executed includes a number of prefetch instructions, then software may be attempting to direct the prefetching of data. Since the software writer (e.g. programmer or compiler) may have a higher level view of the code execution than the hardware, its prefetch predictions may often be more accurate. Accordingly, if software-initiated prefetching is being performed, scaling back or stopping the hardware-initiated prefetching may result in better overall performance, in some cases. Since the active prefetched streams are shared, more software-initiated prefetch streams may automatically result in fewer hardware-initiated prefetch streams.

Various instruction set architectures (ISAs) may define different prefetch instructions. Generally, a prefetch instruction may include any dedicated instruction that can be used by software to initiate a prefetch operation. For example, in the PowerPC™ ISA, the data cache block touch (dcbt), the data cache block touch for store (dcbtst), and the data stream touch (dst) may be examples of prefetch instructions. These instructions, unlike load/store instructions, do not change any architected state of the processor 10 or the system that includes the processor, but may cause the block identified by address operands of the instruction to be prefetched into the cache (and possibly other blocks). Various attributes may be specified to indicate the desired prefetch controls. The data stream touch is defined to be a streaming prefetch. Other ISAs may include any type of prefetch instructions.

In one embodiment, the prefetch unit 40 may implement a combined filtering and prefetch function. The prefetch unit 40 may include a buffer having a plurality of entries (shown in more detail in FIG. 3) and may perform both filtering and prefetching using the entries. That is, a given prefetch stream may be assigned to one of the entries, and both filtering of load/store traffic and generation of prefetches may be performed for that prefetch stream based on the contents of the entry. Filtering may refer to observing the load/store traffic and determining which load/store accesses, if any, are associated with the prefetch stream and thus may cause the prefetch state to be updated. For example, the addresses of the loads/stores may be compared to the current address and/or the next expected address in the stream, and may be used to validate or update the detected prefetch pattern for the stream.

A "prefetch stream" may refer to a stream of addresses (and blocks associated with those addresses) that are prefetched into the cache as a result of detected prefetch pattern. The prefetch pattern may describe the difference between consecutive memory accesses in the prefetch stream (or between accesses that differ by at least the granularity for which prefetch requests are generated, such as a cache block). In one embodiment, the prefetch unit 40 may detect unit stride patterns (that is, fetches of consecutive blocks in memory, either in an increasing-address or decreasing-address direction) for hardware-initiated prefetches. Other embodiments may detect more complex prefetch patterns, including larger strides and repeating patterns that are not a single fixed distance between memory accesses. Software-initiated prefetching may be performed according to the prefetch pattern specified by the instruction or according to a defined pattern (e.g. unit stride, in one embodiment). A prefetch stream may be active if prefetches are being generated from the stream or if the prefetch pattern for the stream is being learned.

A prefetch may generally refer to the fetching of data from memory before that data is actually needed for computation by instructions in the program. In the case of hardware-initiated prefetch, the prefetching may be based on a prediction made from observing the load/store traffic in the data cache 30 or at other points in the processor 10. In one particular embodiment, only load traffic is observed. In the case of software-initiated prefetching, the prediction may be based on the programmer's/compiler's expectations as to which addresses will be generated in upcoming code execution.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each ISA-defined instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. In other embodiments, there may be a one to one correspondence between instruction operations and instructions. That is, the instruction operations may be decoded instructions in such embodiments. Memory operations may be a type of instruction operation. In various embodiments, memory operations may be implicitly specified by an instruction having a memory operation, or may be derived from explicit load/store instructions. If microops are not used, the memory operations may be decoded explicit load/store instructions or derived from implicit memory operations. Similarly, a prefetch operation may be an instruction operation derived from a prefetch instruction.

Microops generated by the decode unit 16 may be provided to the mapper 18. The mapper 18 may implement register renaming to map source register addresses from the microops to the source operand numbers identifying the renamed source registers. Additionally, the mapper 18 may assign a scheduler entry to store each microop. In one embodiment, the schedule entry may also identify the rename register assigned to the destination of the microop. In other embodiments, the mapper 18 may assign a separate destination register number. In some embodiments, the mapper 18 may assign an LSQ entry in the LSQ 36 to load/store memory operations. Thus, each load/store memory operation may have its entry in the LSQ 36 preassigned, prior to issuance.

The mapper 18 may provide the microops, along with scheduler entry ID, source operand numbers, and LSQ number (if applicable) for each microop to scheduler 20. The scheduler 20 may store the microops in the identified scheduler entries along with the source operand numbers and LSQ number.

The scheduler 20 may schedule the microops for execution in the execution core 24. When a microop is scheduled, the scheduler 20 may read its source operands from the register file 22 and the source operands may be provided to the execution core 24. For load/store operations, the source operands include address operands used to generate the address of the memory location accessed by the load/store operation. Address operands of a load/store operation may include register operands provided from the register file 22 as well as displacement operands encoded in the load/store microop itself.

Load/store operations and prefetch operations may be scheduled to the address generation unit 26, which generates the address of the operation from the address operands. If address translation is enabled, the address generated by the address generation unit 26 may be an effective address or virtual address, to be translated to a physical address through the address translation mechanism. In the illustrated embodiment, the translation unit 28 may perform the address translation, generating the physical address. In other embodiments, the translation mechanism may be included in the data cache 30. The translation unit 28 may comprise, for example, a translation lookaside buffer (TLB) that caches previously used translations. In one implementation that implements that PowerPC instruction set architecture, the translation unit 28 may comprise an effective to real address translation (ERAT) table that caches the result of translating effective addresses to real (physical) addresses. In some embodiments, the translation unit 28 may also implement hardware to walk the translation tables (typically created by software and stored in memory) in the event of a miss for a translation in the TLB, ERAT, or other translation caching structure. Any translation hardware may be implemented in various embodiments.

In addition to providing virtual to physical address translations, the translation unit 28 may provide various translation attributes defined in the translation mechanism.

For example, the translation attributes may include access permissions such as read/write access permissions which may be controlled on a privilege level basis, in some embodiments. The translation attributes may also include other controls, such as cacheability, coherency, etc. In some cases, a given load/store operation may result in an exception due to the translation attributes. In the illustrated embodiment, the exceptions may be reported by the LSU 32. In other embodiments, the translation unit 28 may report the exceptions.

The address from the translation unit 28 is provided to the data cache 30, the LSU 32, and the prefetch unit 40. For load microops, the load data may be provided from either the data cache 30 or the LSU unit 32 through the mux 38. For example, the data may be provided by LSU 32 from the LSQ 36, if the load accesses bytes updated by a previous uncommitted store that is in the LSQ 36. The data may be provided from the data cache 30 if the load is a hit in the data cache 30 and the data is not provided from a previous uncommitted store in the LSQ 36. In some embodiments, the memory request buffer 42 may be used as a store merge buffer for committed stores, and data may be forwarded from the memory request buffer as well.

For store operations, the LSU 32 may write the store address and store data to the LSQ 36. Load operations may also be written to the LSQ 36 (e.g. for ordering purposes or to await fill data in the event of a cache miss). If any exceptions have been detected (by the translation unit 28 or other exception sources), the LSU 32 may report the exception(s) detected to the scheduler 20.

In some cases, a memory operation may be replayed by the LSU 32. Generally, replay may cause the scheduler 20 to reschedule (reissue) the memory operation for execution. For example, if a load is executed out of order with respect to a previous store but accesses one or more bytes updated by the store, the load may be replayed in response to execution of the previous store. The scheduler 20 receives the replay signal, and may update its state to cause the replayed operation to be rescheduled at a later time. The scheduler 20 may also reschedule any subsequent microops, or subsequent microops that are dependent on the microop that is replayed. In one embodiment, the scheduler 20 may track which microops are in which pipeline stages in the execution core 24, and may thus associate the replay signal with the appropriate microop. In other embodiments, the replay signal may also identify the microop to the scheduler 20 or may be accompanied by an identifier.

In addition to maintaining the LSQ 36, the LSU 32 may have various other functions in some embodiments. For example, the LSU 32 may also enforce various load/store ordering rules, handle synchronization of memory operations as needed, participate in cache miss handling, etc. While a combined LSQ 36 has been described above, other embodiments may implement separate load and store queues.

The register file 22 may generally comprise any set of registers usable to store operands and results of microops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The interface unit 34 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In the illustrated embodiment, the interface unit 34 includes the memory request buffer 42 to store requests for the external interface, including requests generated for load/store memory operations that miss in the data cache 30, instruction fetch misses from the instruction cache 14, etc.

While the embodiment of FIG. 1 shows the execution core 24 including an address generation unit 26, a translation unit 28, a load/store unit 32, and a data cache 30, other embodiments may include any desired components. For example, multiple address generation units, translation units, load/store units, and/or data caches may be provided. Other units may be provided as well (e.g. one or more integer units, one or more floating point units, one or more graphics units, one or more cryptographic units, etc.). Generally, the execution core 24 may include any circuitry for executing instructions (or microops, in the illustrated embodiment).

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

Turning now to FIG. 2, a more detailed block diagram of one embodiment of a portion of the processor 10 is shown. Particularly, a load/store pipeline (L/S pipe) 50 is shown, along with the data cache 30, the MRB 42, and the prefetch unit 40.

Figures 5, 6:
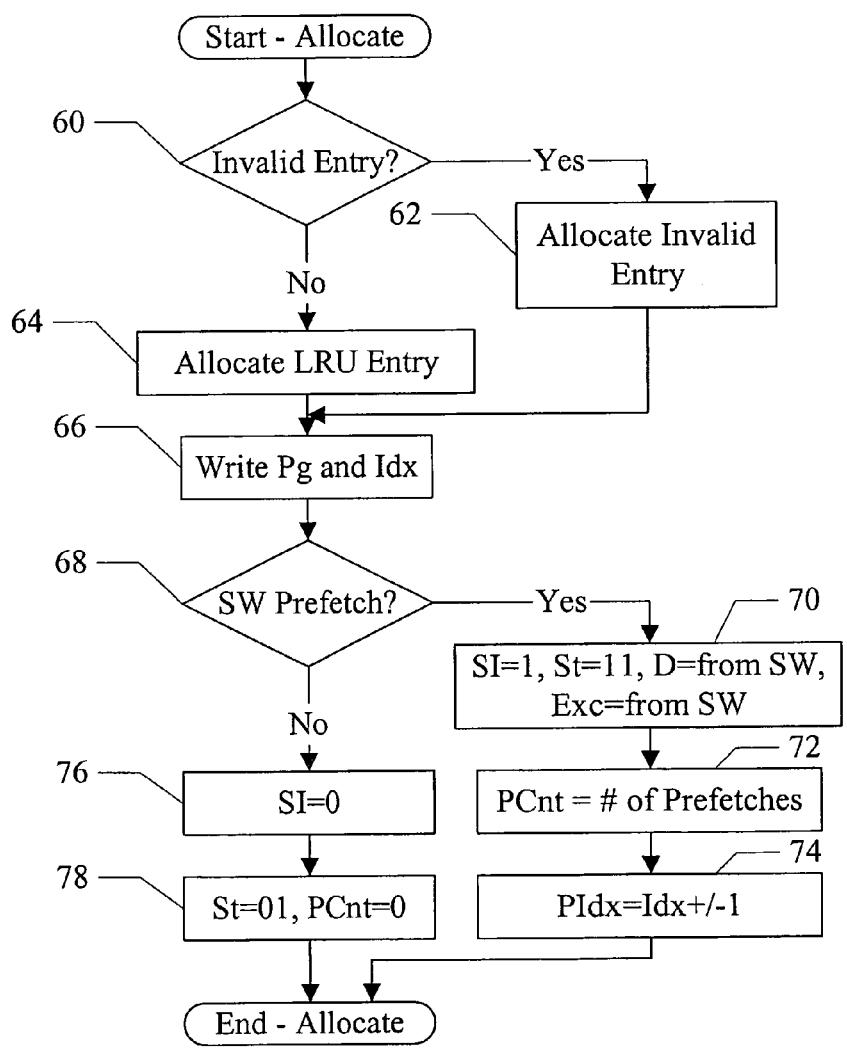
FIG. 5 is a pipeline diagram illustrating a portion of one embodiment of a pipeline that may be implemented in one embodiment of the processor shown in FIG. 1, for a load/store operation or software prefetch instruction.
FIG. 6 is a flowchart illustrating operation of one embodiment of the prefetch unit to allocate an entry.
Figures 8, 9:
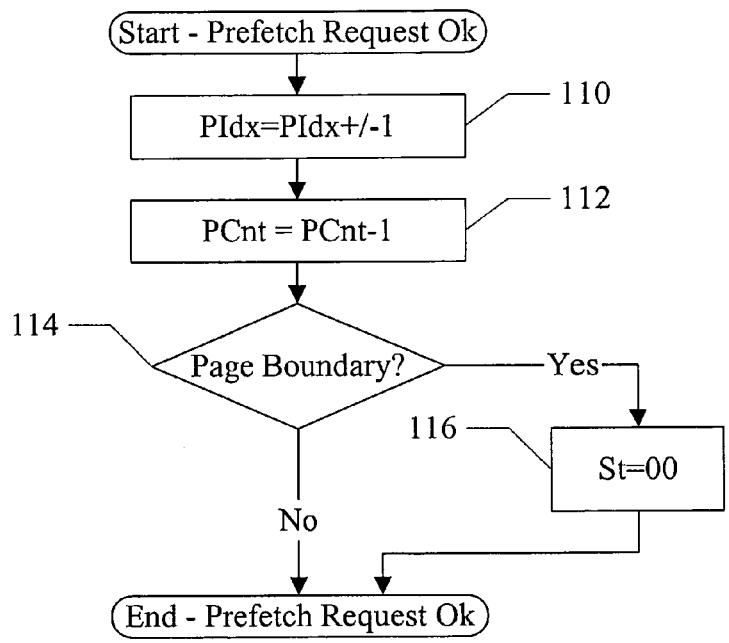
FIG. 8 is a pipeline diagram illustrating a portion of one embodiment of a pipeline that may be implemented in one embodiment of the processor shown in FIG. 1, for a prefetch request.
FIG. 9 is a flowchart illustrating operation of one embodiment of a prefetch unit in response to a prefetch request successfully enqueing in an interface unit.

The L/S pipe 50 may represent a portion of the pipeline that load/store memory operations and prefetch operations traverse as they are executed. The pipeline may include any number of stages at which portions of the execution may be performed. Specific pipeline stages are shown in FIGS. 5 and 8 and described in more detail below. However, other embodiments may divide the operations among the pipeline stages in other fashions and/or may include more or fewer stages for the same operations.

The L/S pipe 50 logically flows from left to right in FIG. 2, and illustrates the order in which the data cache 30, the MRB 42, and the prefetch unit 40 receive a memory operation, prefetch operation, or prefetch request generated by the prefetch unit 40, for one embodiment. In the illustrated embodiment, the data cache 30 is accessed first. The data cache 30 detects hit/miss for the access, and signals the prefetch unit 40 (e.g. via the miss signal in FIG. 2). The MRB 42 is accessed, and if the memory operation, prefetch operation, or prefetch request is a miss in the data cache 30, the MRB 42 may attempt to allocate an entry for the operation to be communicated on the external interface. If the operation hits in the MRB 42, the cache block affected by the operation is either already being fetched from memory or is being written back to memory. Such a hit may be treated as a cache hit, for prefetching purposes. If the operation is not replayed (signalled by the LSU 32) and is allocated to the MRB 42 (or is a hit in the data cache 30), the prefetch unit 40 may receive the operation for filtering and possible prefetch generation.

Accordingly, in this embodiment, the prefetch unit 40 may process only those operations that, at a minimum, are not being immediately returned to the scheduler 20 to be rescheduled at a later point. The operations may still be speculative, and may be replayed or otherwise rescheduled, in some embodiments. In other embodiments, the operations may be non-speculative and thus, if not replayed, will be completed. In other embodiments, the prefetch unit 40 may operate in parallel with entry of operations into the LSQ 36.

If the AGU 26 signals idle, the prefetch unit 40 may generate a prefetch request and transmit it to the AGU 26 for insertion into the L/S pipe 50 (e.g. at the address generation (AG) state, in one embodiment). The prefetch request is shown in FIG. 2 feeding into the left end of the L/S pipe 50 in FIG. 2.

Turning next to FIG. 3, a block diagram is shown illustrating one embodiment of the prefetch unit 40 in more detail. In the illustrated embodiment, the prefetch unit 40 includes a control unit 52 and a buffer 54. The control unit 52 may maintain LRU state 56 across the buffer entries in the buffer 54 for replacement purposes. The control unit 52 is coupled to the buffer 54 and to receive the miss, replay, and idle signals from the data cache 30 (and the MRB 42, in some embodiments), the LSU 32, and the AGU 26, respectively. The control unit 52 is further coupled to transmit a prefetch request to the AGU 26. The buffer 54 is coupled to the receive the address of an operation that has reached the prefetch unit 40 in the L/S pipe 50.

The buffer 54 includes an entry for each of the prefetch streams that may be concurrently pending in the prefetch unit 40. An exemplary entry 58 is shown in FIG. 3, for one prefetch stream. The entry 58 includes a variety of fields in the illustrated embodiment, described in more detail below. Other embodiments may include any desired fields for information, including subsets or supersets of that shown in FIG. 3.

In the illustrated embodiment, the entry 58 includes a defeature (DFT) bit, a software-initiated (SI) bit, a page number (Pg) field, an index field (Idx), a direction (D) bit, a state (St) field, a prefetch index (PIdx) field, a prefetch count (PCnt) field, and an exclusive (Exc) bit. The DFT bit may be used to disable an entry from use. For example, the DFT bit may be used by software to limit the total number of entries 58 that may be in use. If the DFT bit is set, the entry is disabled. If the DFT bit is clear, the entry is enabled. Other embodiments may reverse the meanings of the set and clear states of the bit or any other bit described herein, or use any other indication. The DFT bit may also be hard-set (e.g. by blowing a fuse at manufacture) to permanently disable the entry 58. The SI bit differentiates entries that are storing data related to software-initiated prefetch streams (SI bit set) from hardware-initiated prefetch streams (SI bit clear).

The Pg field may store the page number of the address with which the prefetch stream is associated. In the present embodiment, the prefetch unit 40 may permit one prefetch stream per page, and thus accesses within the same page may be associated with the same stream, in this embodiment. Other embodiments may permit more than one prefetch stream per page. Generally, a page may be the granularity at which memory is allocated to virtual address space. That is, if any virtual address within a given virtual page translates to an address in a physical page, all virtual addresses in that given virtual page translate to the physical page. Page sizes vary from embodiment to embodiment, dependent on the ISA implemented by the processor 10. Exemplary page sizes may be in the range of 4 kilobytes to 16 kilobytes, for example. Other embodiments may support even larger page sizes, in the megabyte or even gigabyte range. Some embodiments may support more than one page size.

By correlating prefetch streams to the page size, the present embodiment may avoid handling translation issues for prefetching and may use physical addresses. When the page boundary is reached in the prefetch stream, the prefetch unit 40 may stop prefetching for that stream. Other embodiments may also store the virtual address of the page, and may transmit the virtual address (incremented by one page) through the translation mechanism to determine if a translation can be found. If so, prefetching may continue into the new page. In one implementation, a few least significant bits of the page portion of the virtual address (e.g. 4 bits) may be saved, and if the page boundary is reached and a subsequent memory operation having a virtual address that matches the saved portion (incremented by one) occurs, the prefetch unit 40 may assume that the subsequent memory operation is part of the same prefetch stream and may update the Pg field with the new physical page number corresponding to the subsequent memory operation.

The Idx field stores the index within the page of the most recent memory operation that has been associated with the prefetch stream in the entry 58. The Idx field stores the index to the granularity for which prefetching is managed. For example, the Idx field may include the offset of a cache block within the page (but may exclude the cache block offset bits). Other embodiments may use a smaller granularity, to detect odd strides which may cause the block-to-block stride to vary from prefetch to prefetch. The combination of the Pg field and the Idx field may be used to filter incoming memory operations. The D bit indicates the direction of the stride for this prefetch stream (positive or negative). For example, the clear state of the D bit may indicate a positive stride (subsequent blocks at increasing addresses) and the set state of the D bit may indicate a negative stride (subsequent blocks at decreasing addresses).

The St field stores the state of the prefetch stream. Generally, as more memory operations are detected that are associated with the prefetch stream, the more information is learned about the prefetch stream for hardware-initiated prefetch streams. Any set of states may be used. One embodiment of the states is shown in the table of FIG. 4. Particularly, in this embodiment, the state may be two bits. If the bits are "00", the entry 58 may be invalid (that is, not currently allocated to a prefetch stream). If the bits are "01", the state is allocated to a prefetch stream. If the bits are "10", the stride for the prefetch stream has been computed. In this embodiment, unit strides are handled and thus computing the stride may be simply determining the direction. Other embodiments may implement more variation in the strides that can be handled. If the bits are "11", the prefetch stream is ready to generate prefetch requests. The control unit 52 may select an entry having the state of "11" from which to generate a prefetch request.

The PIdx field stores the prefetch index. The prefetch index, in conjunction with the page number from the Pg field, is the block address of the next prefetch request to be generated. The PCnt field stores a count of the number or prefetches to be generated. In various embodiments, the number of prefetches that may be generated ahead of the most recent non-prefetch operation may either be fixed or programmable. For example, in one embodiment, the number of prefetches may be programmable as either 4 or 8 prefetches. In another embodiment, the number of prefetches may be fixed (e.g. at 4 prefetches). The Exc bit may indicate whether or not the prefetch request is for exclusive access. For example, the dcbtst may result in prefetch requests that are for exclusive access.

While the illustrated embodiment uses LRU for replacement purposes, other embodiments may implement any desired replacement policy (e.g. modified LRU, pseudo-LRU, random, first-in-first-out, etc.). Generally, the buffer 54 may comprise any memory (e.g. one or more random access memory arrays, clocked storage devices such as flops, latches, registers, etc., or combinations of memory arrays and clocked storage devices), in various embodiments, arranged as a set of entries such as entry 58.

Turning now to FIG. 5, a pipeline diagram is shown illustrating stages that may be part of the L/S pipe 50 for one embodiment. Operation at each stage is shown for a filtering pass by a memory operation or a prefetch operation. For brevity, the description of FIG. 5 below will refer to a memory operation. Similar operation may occur for a prefetch operation, except as otherwise noted. The stages shown in FIG. 5 include a data tag (DT) stage, a data directory (DD) stage, a load writeback (LW) stage, a load writeback+1 (LW+1) stage, and a load writeback+2 (LW+2) stage.

At the DT state, the data cache lookup is performed. In the illustrated embodiment, the data cache lookup is pipelined over two clock cycles. Thus, the data cache hit/miss is available for the memory operation in the DD stage. The MRB lookup also occurs in the DD stage, in this embodiment. At the LW stage, any replay conditions that may exist for the memory operation may be detected. If the memory operation is not replayed, the memory operation is filtered against the existing prefetch streams in the prefetch unit 40 in the LW+1 stage. For example, the address of the memory operation may be cammed over the buffer entries on the Pg field, and if a match occurs, the memory operation may be associated with the corresponding prefetch stream. In the LW+2 stage, if the address of the memory operation is a miss, the prefetch unit 40 may allocate a new buffer entry to the memory operation (starting a new prefetch stream). If the address is a hit, the entry that is hit may be updated (associating the memory operation with the corresponding prefetch stream).

In one embodiment, memory operations may not match on entries that are software-initiated prefetch streams (SI bit set). Prefetch operations may similarly be prefetched from matching on hardware-initiated prefetch streams (SI bit clear), or may take over the matching entries, setting the SI bit, in various embodiments.

FIG. 6 is a flowchart illustrating operation of one embodiment of the prefetch unit 40 (and more particularly the control unit 52, in the embodiment of FIG. 3) to allocate an entry in the buffer 54 for a memory operation or prefetch instruction that is not associated with the active prefetch streams. While the blocks are shown in a particular order for ease of understanding, other orders may be used. Furthermore, blocks may be performed in parallel in combinatorial logic within the prefetch unit 40. Blocks, combinations of blocks, and/or the flowchart as a whole may be pipelined over multiple clock cycles, in various embodiments.

The prefetch unit 40 attempts to identify an invalid entry (St=00). An invalid entry is an entry that is not currently allocated to an active prefetch stream. If an invalid entry is located (decision block 60, "yes" leg), the prefetch unit 40 may allocate the invalid entry (block 62). Otherwise (decision block 60, "no" leg), the prefetch unit 40 may allocate the LRU entry as indicated by the LRU state 58 (block 64). Other embodiments may employ other replacement schemes. The prefetch unit 40 may write the page number and index of the address into the Pg and Idx fields (block 66). The prefetch unit 40 may also update the LRU state to indicate that the allocated entry is most recently used.

If the operation being allocated is a software prefetch operation (decision block 68, "yes" leg), the prefetch unit 40 may avoid training for the prefetch stream since software directs the prefetching. Thus, the prefetch unit 40 may set the SI bit, set the St field to "11" (prefetch ready), set or clear the D bit as specified by the prefetch instruction, and set or clear the Exc bit based on the type of prefetch instruction (block 70). The prefetch unit 40 may also set the PCnt field (block 72). In one embodiment, the PCnt field may be set to the number or prefetches that the prefetch unit 40 performs (e.g. fixed at 4, programmable as 4 or 8, or any other specification). Alternatively, the number of prefetches to perform may be based on the type of prefetch instruction or attributes specified by the prefetch instruction, in some embodiments. The prefetch unit 40 may further set the PIdx field to the Idx field plus or minus 1 based on the D bit (since unit strides are handled in this embodiment) (block 74). In other embodiments, the PIdx may be set to the Idx field plus or minus the stride specified by the prefetch instruction.

In other embodiments, software may use the SI bit to preallocate buffer entries for software use (by setting the SI bits in those entries). In such embodiments, the prefetch unit 40 may allocate an entry having the SI bit set for a software prefetch (and an entry having the SI bit clear for a hardware prefetch). The prefetch unit 40 may maintain separate replacement data for hardware versus software entries.

If the operation being allocated is not a software prefetch (decision block 68, "no" leg), it is hardware-initiated. In such cases, the prefetch unit 40 may learn more about the prefetch stream before beginning to prefetch for the stream. In such cases, the prefetch unit 40 may clear the SI bit in the allocated entry (block 76), set the St field to "01", and the PCnt to zero (block 78).

Figure 7:
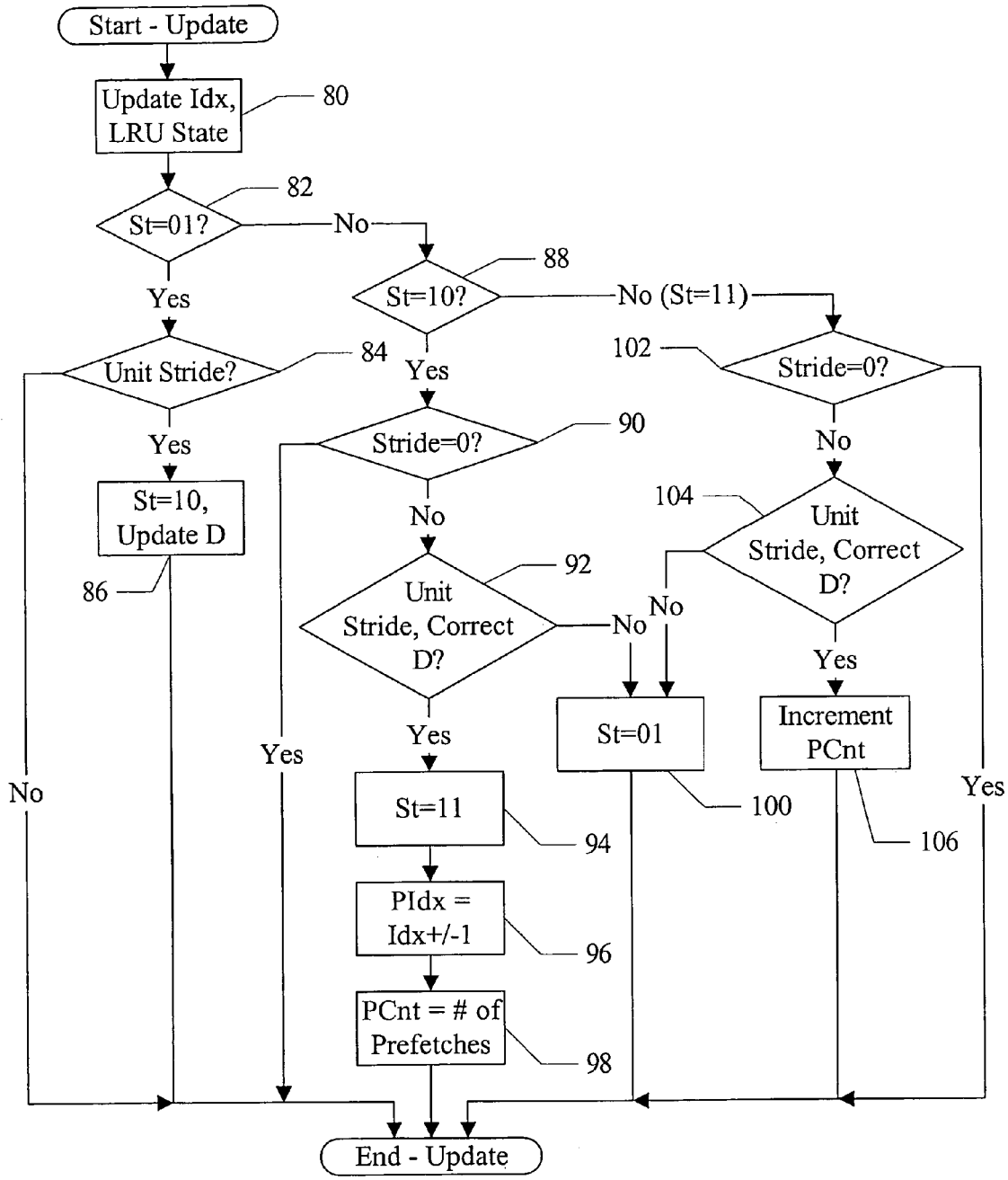
FIG. 7 is a flowchart illustrating operation of one embodiment of the prefetch unit to update an entry.

Turning now to FIG. 7, a flowchart is shown illustrating operation of one embodiment of the prefetch unit 40 (and more particularly the control unit 52, in the embodiment of FIG. 3) to update an entry in the buffer 54 for a memory operation or prefetch operation that hits the entry. While the blocks are shown in a particular order for ease of understanding, other orders may be used. Furthermore, blocks may be performed in parallel in combinatorial logic within the prefetch unit 40. Blocks, combinations of blocks, and/or the flowchart as a whole may be pipelined over multiple clock cycles, in various embodiments.

The embodiment illustrated in FIG. 7 handles a unit stride (positive or negative). Other embodiments may handle larger strides in an analogous fashion to that show in FIG. 7, where any stride within the range for which the prefetch unit 40 is designed is handled similar to the unit stride case.

The prefetch unit 40 may update the Idx field to the Idx portion of the address from the operation, and may also update the LRU state to indicate that the hit entry is most recently used (block 80). Additional operation is dependent on the current state of the entry.

If the state is "01" (allocated) (decision block 82, "yes" leg), then the prefetch unit 40 may compute the stride for the prefetch stream. If the stride is a unit stride (decision block 84, "yes" leg), the prefetch unit 40 may update the St field to "10" (stride computed) and may update the D bit based on the direction of the stride (block 86). If the stride is either zero or greater than one, no additional update is performed (decision block 84, "no" leg) and thus the state remains "01". If the stride is zero, a subsequent memory operation may have a unit stride. If the stride is greater than one, no prefetching may ultimately be performed for the prefetch stream.

If the state is "10" (stride computed) (decision block 88, "yes" leg), then the prefetch unit 40 may be able to verify the stride and begin prefetching for the prefetch stream. If the stride is zero (decision block 90, "yes" leg), a subsequent memory operation may confirm the stride and so no additional update is made. If the stride is a unit stride in the direction indicated by the D bit (decision block 92, "yes" leg), the prefetch unit 40 may update the St field to "11" (prefetch ready) (block 94). The prefetch unit 40 may further update the PIdx field to the Idx field plus or minus 1 stride, dependent on the direction field (block 96) and may set the PCnt field to the number of prefetches to be performed by the prefetch unit 40 (block 98). If the stride is not a unit stride in the direction indicated by the D field (decision block 92, "no" leg) then the stride has not been confirmed. The prefetch unit 40 may set the state back to "01" (allocated) to attempt to relearn the stride (block 100).

If the state is "11" (prefetch ready) (decision block 88, "no" leg), the prefetch unit 40 has previously verified the stride. The prefetch unit 40 may again verify the stride (to detect if a previous stride no longer applies). If the stride is zero (decision block 102, "yes" leg), a subsequent memory operation may confirm the stride and so no additional update is made. If the stride is a unit stride in the direction indicated by the D bit (decision block 104, "yes" leg), the prefetch unit 40 has again confirmed the stride. Since prefetching may already have been initiated for the entry, the prefetch unit 40 may not update the PIdx field. However, the prefetch unit 40 may increment the PCnt field to permit an additional prefetch from the entry (block 106). The increment may saturate at the value to which the PCnt is initialized when a stride is confirmed. If the stride is not a unit stride in the direction indicated by the D field (decision block 104, "no" leg) then the stride has not been confirmed. The prefetch unit 40 may set the state back to "01" (allocated) to attempt to relearn the stride (block 100).

Once at least one entry in the buffer 54 is in the prefetch ready state, the prefetch unit 40 may being generating prefetch requests. In the present embodiment, prefetch requests are generated and transmitted to the AGU 26 when the AGU 26 indicates idle. If more than one entry is in the prefetch ready state (and has a non-zero PCnt), the prefetch unit 40 may use any arbitration algorithm to select an entry from which to generate a prefetch request. For example, a round robin scheme may be used. In some embodiments, priority may be given to software-initiated prefetch streams in the round-robin scheme. A prefetch request may include a prefetch address formed by concatenating the contents of the Pg field and the PIdx field, as well as control information identifying the request as a prefetch in the L/S pipe 50.

In one embodiment, the prefetch unit 40 may generate a prefetch request for an entry but may not update the entry (and generate additional prefetch requests from the entry) until the prefetch request is known to pass the MRB 42 without being replayed. Other embodiments may pipeline the requests but drop them if a request is replayed.

FIG. 8 is a pipeline diagram illustrating stages that may be part of the L/S pipe 50 for one embodiment. Operation at each stage is shown for a prefetch request generated by the prefetch unit 40. The stages shown in FIG. 5 include an address generation (AG) stage, a translation (TR) stage, the DT stage, the DD stage, and the LW stage.

At the AG stage, the prefetch request is inserted responsive to the idle signal. In the TR stage, since physical addresses are used by the prefetch unit 40 in this embodiment, no translation is needed and the address of the prefetch request is transmitted to the data cache 30. In the DT stage, the prefetch request performs a data cache lookup and the data cache hit/miss is available in the DD stage. The MRB lookup also occurs in the DD stage, as noted previously. At the LW stage, any replay conditions that may exist for the prefetch request may be detected. If the prefetch request is not replayed, the entry corresponding to the prefetch request may be updated. Assuming the prefetch request missed in the data cache 30, the MRB 42 may also allocate an entry for the prefetch request at the LW stage, to request the cache block from memory.

When the cache block is returned to the data cache 30 in response to a prefetch request, the block may be written to the LRU way of the data cache 30 (thus being less likely to displace useful data from the data cache 30 if the prefetch data is not used later). Alternatively, the cache block may be written to the MRU way unless the prefetch request was software-initiated and a transient attribute (indicating that the data is expected to be used only transiently) is indicated in the prefetch instruction.

In some embodiments, the interface unit 34 may include a duplicate data cache tags, to check snoop or probe transactions from the external interface against. In some such embodiments, prefetch requests may be transmitted through the duplicate data cache tags to detect hit/miss and may be entered into the MRB 42 if a miss. In such an embodiment, an idle signal may be provided by the interface unit 24, indicating that the duplicate tags are idle.

Turning now to FIG. 9, a flowchart is shown illustrating operation of one embodiment of the prefetch unit 40 (and more particularly the control unit 52, in the embodiment of FIG. 3) to update an entry in the buffer 54 in response to a successful prefetch request from the entry. While the blocks are shown in a particular order for ease of understanding, other orders may be used. Furthermore, blocks may be performed in parallel in combinatorial logic within the prefetch unit 40. Blocks, combinations of blocks, and/or the flowchart as a whole may be pipelined over multiple clock cycles, in various embodiments.

The prefetch unit 40 may increment or decrement the PIdx field based on the direction bit (block 110). Additionally, the prefetch unit 40 may decrement the PCnt to reflect successful transmission of a prefetch request (block 112). If the prefetch stream has reached a page boundary (decision block 114, "yes" leg), the prefetch unit 40 may clear the state to "00", thus freeing the entry (block 116). For software-initiated prefetch streams, if the PCnt is reduced to zero, the state may similarly be set to "00", in some embodiments.

In some embodiments, the prefetch unit 40 may only be active during user mode. If the processor is in supervisor/hypervisor mode, the prefetch unit 40 may be inactive. However, the prefetch unit 40 may retain its state to continue prefetching upon a return to user mode. In another embodiment, software may write the SI bit in one or more entries to reserve them for software use. The prefetch unit 40 may select among entries having the SI bit set to allocate an entry when a prefetch instruction is executed, and may select among entries having the SI bit clear to allocate an entry when a load/store memory operation is executed. Alternatively, software may directly control the allocation of entries among the entries having the SI bit set. For example, the entries may be mapped to hardware implementation dependent (HID) register addresses that can be read/written by software.

It is noted that prefetch instructions may optionally specify various prefetch attributes. For example, a transient attribute may be specified if the prefetched block is expected to be used briefly, as mentioned above. Additionally, an unlimited attributed may be specified to indicate that unlimited prefetching is desired. A store attribute may be specified, which may be used to set the Exc bit. Other attributes may be defined, as desired. Such attributes may be stored in the LSQ 36 entry assigned to the prefetch operation, or in the buffer 54, in various embodiments.

Numerous variations and modifications will become apparent to those skilled in the art once the above disclosure is fully appreciated. It is intended that the following claims be interpreted to embrace all such variations and modifications.

What is claimed is:

1. A processor comprising:
a prefetch unit configured to concurrently maintain a plurality of separate, active prefetch streams, wherein each of the plurality of prefetch streams is either software initiated via execution by the processor of a dedicated prefetch instruction that is defined in the instruction set architecture implemented by the processor to cause a prefetch operation or hardware initiated via detection of a data cache miss by one or more load/store memory operations, and wherein a first prefetch stream of the plurality of prefetch streams is allocable to a software initiated prefetch in a first instance, and wherein the first prefetch stream is allocable as a hardware initiated stream in a second instance; and
a data cache coupled to the prefetch unit, wherein the prefetch unit is configured to generate prefetch requests responsive to the plurality of prefetch streams to prefetch data in to the data cache, wherein each of the plurality of prefetch streams corresponds to a plurality of prefetch requests.

2. The processor as recited in claim 1 further comprising a pipeline to access the data cache and generate requests to an interface unit, wherein the prefetch unit is coupled to the pipeline to insert the prefetch requests in a first stage of the pipeline that is prior to a second stage of the pipeline in which the data cache is accessed.

3. The processor as recited in claim 2 wherein the prefetch unit is configured to insert a prefetch request if the first stage is idle.

4. The processor as recited in claim 2 wherein a hardware initiated prefetch stream is generated in the prefetch unit responsive to the load/store memory operation not being replayed in the pipeline.

5. The processor as recited in claim 1 wherein the prefetch unit is configured to maintain a state for each prefetch stream, and wherein the prefetch unit is configured to generate a prefetch request for a prefetch stream having a state indicating that prefetch is ready.

6. The processor as recited in claim 5 wherein the prefetch unit is configured to select one of the plurality of prefetch streams for which to generate the prefetch request in a round-robin fashion if more than one of the plurality of prefetch streams has the ready to prefetch state.

7. The processor as recited in claim 5 wherein the prefetch unit is configured to allocate a software-initiated prefetch stream in the ready to prefetch state.

8. The processor as recited in claim 5 wherein the prefetch unit is configured to detect a pattern of cache accesses in a given hardware-initiated prefetch stream before making the given prefetch stream have the ready to prefetch state.

9. The processor as recited in claim 1 wherein each of the plurality of prefetch streams is located in a different memory page.

10. A processor comprising:
a prefetch unit configured to concurrently maintain a plurality of separate, active prefetch streams, wherein each of the plurality of prefetch streams is either software initiated via execution by the processor of a dedicated prefetch instruction or hardware initiated via detection of a data cache miss by one or more load/store memory operations, wherein the prefetch unit is configured to maintain a state for each prefetch stream, and wherein the prefetch unit is configured to generate a prefetch request for a prefetch stream having a state indicating that prefetch is ready, and wherein the prefetch unit is configured to maintain a count of a number of prefetch requests remaining for a given prefetch stream, and wherein the prefetch unit is configured to generate the prefetch request from the stream if the count is non-zero; and
a data cache coupled to the prefetch unit, wherein the prefetch unit is configured to generate prefetch requests responsive to the plurality of prefetch streams to prefetch data in to the data cache.

11. The processor as recited in claim 10 wherein the prefetch unit is configured to detect another load/store memory operation in the given prefetch stream and is configured to increment the count responsive to the memory operation.

12. The processor as recited in claim 10 wherein the prefetch unit is configured to initialize the count to non-zero in response to detecting a pattern of accesses in the given prefetch stream.

13. The processor as recited in claim 12 wherein the prefetch unit is configured to decrement the count in response to successfully transmitting a prefetch request for the given prefetch stream.

14. The processor as recited in claim 13 wherein the prefetch unit is configured to detect another load/store memory operation in the given prefetch stream and is configured to increment the count responsive to the memory operation.

15. The processor as recited in claim 10 wherein the prefetch unit is configured to initialize the count to non-zero in response to the software initiated prefetch being initialized.

16. A processor comprising:
a prefetch unit including a buffer having a plurality of entries, wherein each of the plurality of entries is usable for a different prefetch stream, wherein the prefetch unit is configured to filter load/store memory operations through the buffer and is further configured to generate prefetch requests from the contents of the buffer, wherein a given entry of the plurality of entries is configured to store first address information to filter load/store memory operations and second address information to generate prefetch requests; and
a data cache coupled to the prefetch unit, wherein the prefetch requests cause data to be prefetched into the data cache.

17. The processor as recited in claim 16 wherein the prefetch unit is configured to filter the load/store memory operations by associating a given load/store memory operation with an active prefetch stream in the buffer if the address of the given load/store memory operation matches a prefetch pattern corresponding to the active prefetch stream.

18. The processor as recited in claim 17 wherein the prefetch unit is further configured to filter the load/store memory operations by allocating a new prefetch stream in one of the plurality of entries responsive to the address not matching the active prefetch streams in the buffer.

19. The processor as recited in claim 18 wherein the prefetch unit is configured to learn the prefetch pattern for the new prefetch stream prior to generating one or more prefetch requests for the new prefetch stream.

20. The processor as recited in claim 18 wherein the prefetch unit is configured to allocate an entry that is not currently allocated to an active prefetch stream.

21. The processor as recited in claim 20 wherein, if each of the plurality of entries is allocated to an active prefetch scheme, the prefetch unit is configured to replace an active prefetch stream with the new prefetch stream according to a replacement algorithm.

22. The processor as recited in claim 21 wherein the replacement algorithm is a least recently used algorithm based on associations by load/store memory operations with the active prefetch streams.

23. A processor comprising:
a prefetch unit including a buffer having a plurality of entries, wherein each of the plurality of entries is usable for a different prefetch stream, wherein the prefetch unit is configured to filter load/store memory operations through the buffer and is further configured to generate prefetch requests from the contents of the buffer, wherein the prefetch unit is configured to filter the load/store memory operations by allocating a new prefetch stream in one of the plurality of entries responsive to an address of a given load/store memory operation not matching the active prefetch streams in the buffer, and wherein, if each of the plurality of entries is allocated to an active prefetch scheme, the prefetch unit is configured to replace an active prefetch stream with the new prefetch stream according to a replacement algorithm, wherein the prefetch unit is configured, if allocating an entry for a hardware-initiated prefetch stream, to inhibit replacement of software-initiated prefetch streams that are active in the buffer; and
a data cache coupled to the prefetch unit, wherein the prefetch requests cause data to be prefetched into the data cache.

24. A method comprising:
concurrently maintaining a plurality of separate, active prefetch streams, wherein each of the plurality of prefetch streams is either software initiated via execution by a processor of a dedicated prefetch instruction that is defined in the instruction set architecture implemented by the processor to cause a prefetch operation or hardware initiated via detection of a data cache miss by one or more load/store memory operations, and wherein a first prefetch stream of the plurality of prefetch streams is allocable to a software initiated prefetch in a first instance, and wherein the first prefetch stream is allocable as a hardware initiated stream in a second instance; and generating prefetch requests responsive to the plurality of prefetch streams to prefetch data in to the data cache, wherein each of the plurality of prefetch streams corresponds to a plurality of prefetch requests.

25. The method as recited in claim 24 further comprising inserting a prefetch request in a first stage of a pipeline to access the data cache that is prior to a second stage of the pipeline in which the data cache is accessed, wherein the inserting is responsive to the first stage being idle.

26. The method as recited in claim 24 further comprising maintaining a state for each prefetch stream, and wherein generating a prefetch request for a prefetch stream is responsive to the prefetch stream having a state indicating that prefetch is ready.

27. The method as recited in claim 26 further comprising allocating a software-initiated prefetch stream in the ready to prefetch state.

28. The method as recited in claim 26 further comprising detecting a pattern of cache accesses in a given hardware-initiated prefetch stream before making the given prefetch stream have the ready to prefetch state.

29. The method as recited in claim 26 further comprising maintaining a count of a number of prefetch requests remaining for a given prefetch stream, and generating the prefetch request from the stream is farther responsive to the count being non-zero.

30. The method as recited in claim 29 farther comprising:

detecting another load/store memory operation in the given prefetch stream; and incrementing the count responsive to the memory operation.

* * * * *